United States Patent [19]

Ushijima et al.

[11] 4,219,109
[45] Aug. 26, 1980

[54] OIL PRESSURE CONTROL MEANS FOR AN AUTOMATIC TRANSMISSION

[75] Inventors: Fumihiro Ushijima; Kagenori Fukumura; Keiichi Ito, all of Toyota, Japan

[73] Assignee: Toyota Jidosha Kogyo Kabushiki Kaisha, Toyota, Japan

[21] Appl. No.: 879,884

[22] Filed: Feb. 21, 1978

[30] Foreign Application Priority Data

Feb. 14, 1977 [JP] Japan ................... 52-14749

[51] Int. Cl.$^2$ ............................................. F16D 25/10
[52] U.S. Cl. .............................. 192/87.13; 192/87.18; 192/109 F
[58] Field of Search ............... 192/87.13, 87.18, 87.19, 192/109 F, 3.26, 3.27

[56] References Cited
U.S. PATENT DOCUMENTS

| | | | |
|---|---|---|---|
| 3,541,791 | 11/1970 | Lvovsky et al. | 192/87.18 X |
| 3,572,177 | 3/1971 | Ishihara | 192/109 F |
| 3,602,344 | 8/1971 | Clark | 192/3.26 |
| 3,618,727 | 11/1971 | Cornet | 192/87.13 |
| 3,692,160 | 9/1972 | Hilpert | 192/4 C |

*Primary Examiner*—Allan D. Herrmann
*Attorney, Agent, or Firm*—Stevens, Davis, Miller & Mosher

[57] ABSTRACT

An oil pressure control means for an automatic transmission having a gear mechanism, low and high speed friction engaging means and high and low speed accumulators, wherein in downshifting the operating pressure of the high speed accumulator is reduced abruptly to a level which causes slippage of the high speed friction engaging means in accordance with the rise of the oil pressure in the low speed friction engaging means up to a predetermined level and the operating pressure of the low speed accumulator is increased abruptly to a level which causes substantial engagement of the low friction engaging means in accordance with the reduction of the oil pressure in the high speed friction engaging means to a predetermined level.

7 Claims, 7 Drawing Figures

OIL PRESSURE CONTROL MEANS FOR AN AUTOMATIC TRANSMISSION

BACKGROUND OF THE INVENTION

The present invention relates to an oil pressure control system for an automatic transmission for automobiles, and, more particularly, to an improvement of the shifting performance of the transmission in its downshifting.

In an automatic transmission for automobiles having a fluid torque converter, a gear mechanism and a plurality of friction engaging means, the engagement of the friction engaging means is automatically changed over in accordance with operating conditions of the vehicle so as to establish the most desirable speed shift stage for the moment-to-moment operating conditions of the vehicle. Such a changing over control of the friction engaging means is effected by an oil pressure control means which has a shift valve adapted to be shifted by the balance of the throttle pressure, which varies in accordance with the amount of the accelerator pedal depression (i.e., the throttle opening), and the governor pressure, which varies in accordance with the vehicle speed, and which is adapted to select various speed shift stages in accordance with the contrast between the throttle pressure and the governor pressure, i.e., the accelerator depression pedal versus the vehicle speed. The shift valve is adapted to be shifted between a first shift position where it connects a low speed friction engaging means to a source of line pressure while it drains a high speed friction engaging means and a second shift position where it connects the high speed friction engaging means to the source of line pressure while it drains the low speed friction engaging means. Furthermore, in order to provide a certain overlapping between the disengagment and engagement of the low and high speed friction engaging means in the changing over of the two friction engaging means, which is desirable in order to accomplish smooth shifting between the two speed shift stages, the oil pressure control system generally includes low and high speed accumulators connected individually to the passages for supplying the line pressure to the low and high speed friction engaging means.

Figure 1:
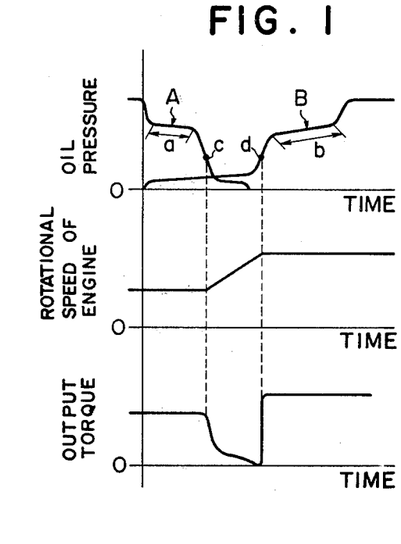
FIGS. 1 and 2 show diagrams illustrating the downshift performance of a conventional oil pressure control means.
Figure 2:
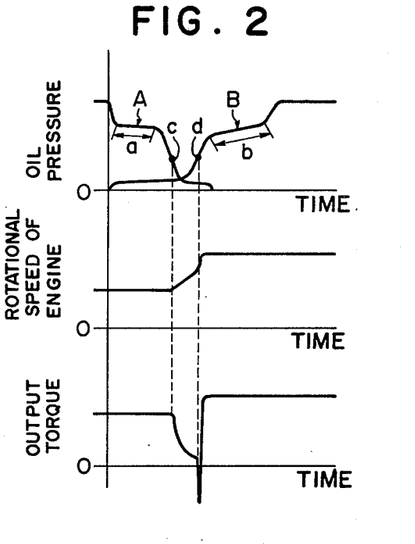

FIG. 1 shows an example of diagrams showing the variation of the oil pressures in the high and low speed friction engaging means, the rotational speed of the engine, and the output torque of the transmission during the downshifting of the transmission from a high speed stage to a low speed stage effected by the changing over of engagement of high and low speed friction engaging means, in a conventional automatic transmission having high and low speed accumulators. In FIG. 1, the curve A in the oil pressure diagram shows the variation of the oil pressure in the high speed friction engaging means (high clutch), and the curve B shows the variation of the oil pressure in the low speed friction engaging means (low clutch). In this diagram, portion 'a' of the curve A corresponds to the operational region of the high speed accumulator, whereas portion 'b' of the curve B corresponds to the operational region of the low speed accumulator. At point 'c' the high clutch becomes substantially disengaged, while at point 'd' the low clutch becomes substantially engaged. When a proper timing such as shown in FIG. 1 is maintained between the disengagement of the high clutch and the engagement of the low clutch, the rotational speed of the engine gradually increases after the disengagement of the high clutch until it reaches the value which corresponds to the momentary vehicle speed at the low speed gear ratio, whereupon the low clutch is just engaged, whereby the downshifting is accomplished relatively smoothly without causing negative torque in the output shaft of the transmission as shown in FIG. 1. However, the output torque of the transmission still undergoes a relatively large variation and the smoothness of such downshifting is not yet perfectly satisfactory. If the timing between the disengagement and engagement of the two friction engaging means becomes improper such as shown in FIG. 2, wherein the engagement of the low clutch is too early relative to the disengagement of the high clutch, the output torque attains momentarily a great negative value and causes an uncomfortable shock. Similarly, although detailed graphs are not shown in the drawing, if on the other hand the engagement of the low clutch is delayed relative to the disengagement of the high clutch, the engine races.

The operating performance of a high speed accumulator, and particularly the operating pressure thereof, is determined so that the shift shock during upshifting is softened while ensuring definite transmission of the driving torque in the operation by the high speed stage. Therefore, in downshifting, during the region 'a' of the curve A in FIG. 1, the oil pressure in the high clutch is maintained at such a high level that no slippage can occur in the high clutch. In this case, therefore, the timing relation between the points 'c' and 'd' is the sole condition which determines smoothness of downshifting. However, it is very difficult to prescribe exactly in advance the proper timing relation between these two time points for every actual oil pressure control means, due to manufacturing tolerances, and furthermore the timing relation varies in accordance with the vehicle speed and the output torque of the engine when downshifting. In view of this, it is almost impossible to provide the optimum timing relation between the disengagement of the high speed friction engaging means and the engagement of the low speed friction engaging means over a wide range of operational conditions of the vehicle.

SUMMARY OF THE INVENTION

It is therefore the object of the present invention to solve the aforementioned problems and to provide an oil pressure control means which is improved with regard to its downshift performance.

In order to accomplish the abovementioned object, the present invention proposes to control the oil pressure in the high clutch by the oil pressure in the low clutch in downshifting so that the oil pressure in the high clutch is reduced down to a level which causes slippage of the high clutch when the oil pressure in the low clutch has risen up to a predetermined level, and to control the oil pressure in the low clutch by the oil pressure in the high clutch so as to increase the oil pressure in the low clutch up to a level which causes substantial engagement of the low clutch when the oil pressure in the high clutch lowers to a predetermined level which causes substantial disengagement of the high clutch.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 3:
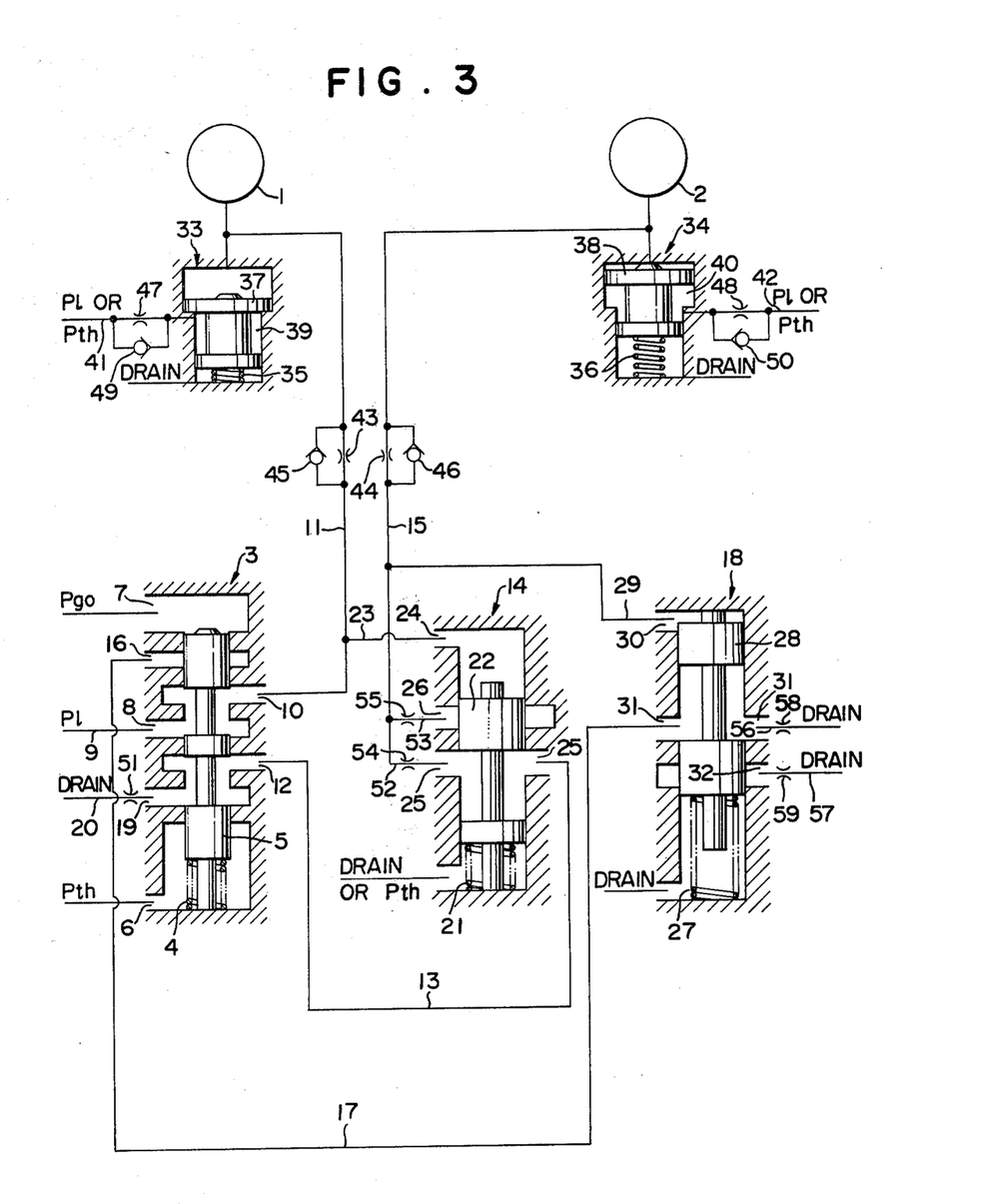
FIG. 3 is a diagram showing essential portions of a first embodiment of the oil pressure control means of the present invention.

Referring to FIG. 3, 1 and 2 designate high and low clutches which may be either connected to a source of oil pressure or alternatively drained by a shift valve 3 so as to be selectively engaged or disengaged. The shift valve 3 comprises a valve element 5 urged upwards in the figure by a compression coil spring 4, said valve element being shifted up and down by the balance of the throttle pressure ($P_{th}$) supplied to a lower port 6 and the governor pressure ($P_{go}$) supplied to an upper port 7. When the valve element 5 is shifted downward as shown in the figure, the line pressure ($P_l$) supplied to a port 8 of the shift valve through a passage 9 is transmitted through a port 10 to a passage 11 so as to be supplied to the high clutch 1. On the other hand, if the valve element 5 is shifted upward, the line pressure supplied to the port 8 is transmitted through a port 12 to a passage 13, and the pressure is further conducted through a control valve 14 and a passage 15 to the low clutch 2. Furthermore, when the valve element 5 is shifted upward, the oil pressure in the high clutch 1 is drained through the passage 11, ports 10 and 16, passage 17 and a control valve 18. On the other hand, when the valve element 5 is shifted downward, the oil pressure in the low clutch 2 is drained through the passage 15, control valve 14, passage 13, ports 12 and 19 toward a drain passage 20.

The control valve 14 comprises a valve element 22 urged upward in the figure by a compression coil spring 21, the valve element 22 being shifted up and down in accordance with the level of the oil pressure in the high clutch supplied to a port 24 through a passage 23 so as to connect a port 25 to a port 26 or to disconnect the port 25 from the port 26.

The control valve 18 comprises a valve element 28 urged upward in the figure by a compression coil spring 27, said valve element being adapted to be shifted up and down in accordance with the level of the oil pressure in the low clutch supplied to a port 30 through a passage 29 so as to connect or disconnect a port 31 to or from a port 32.

33 and 34 designate high and low speed accumulators connected individually to the passages 11 and 15 for supplying oil pressure to the high and low clutches 1 and 2. These accumulators comprise individually pistons 37 and 38 urged upward in the figure by compression coil springs 35 and 36 and back pressure chambers 39 and 40 which are supplied with oil pressure (the line pressure or the throttle pressure) through passages 41 and 42, respectively.

The passages 11 and 15 for the high and low clutches 1 and 2 include individually throttling elements 43, 44 and check valves 45, 46 connected in parallel. The passages 41 and 42 for supplying oil pressure to the back pressure chambers 39 and 40 of the high and low accumulators 33 and 34 also include individual throttling elements 47, 48 and check valves 49, 50 connected in parallel with these throttling elements. Furthermore, the drain passage 20 connected to the drain port 19 of the shift valve 3 includes a throttling element 51, passages 52 and 53 connected individually to the ports 25 and 26 of the control valve 14 include throttling elements 54 and 55, respectively, and drain passages 56 and 57 connected individually to the ports 31 and 32 of the control valve 18 include throttling elements 58 and 59, respectively.

In the oil pressure control means as explained above, when the low clutch 2 is disengaged while the high clutch 1 is engaged to effect upshifting, the line pressure is supplied through the passage 9, the ports 8 and 10 of the shift valve 3, and the passage 11 including the throttling element 43 to the high clutch 1, while on the other hand the oil pressure in the low clutch 2 is drained through the passage 15 including the check valve 46, the control valve 14, and the ports 12 and 19 of the shift valve 3 to the drain passage 20. The timing of the supply of oil pressure to the high clutch 1 in the upshifting is determined by the operating pressure set for the accumulator 33, throttling ratio of the throttling elements 43 and 47 and the difference of land areas of the piston 37 of the accumulator 33. The operating pressure of the accumulator 33 in upshifting is designed at a relatively high level which ensures definite transmission of driving torque through the high clutch while softening the shock caused at the instant of engagement of the high clutch.

By contrast, in downshifting, the oil pressure in the high clutch 1 is drained through the passage 11 including the check valve 45, the ports 10 and 16 of the shift valve 3, the passage 17 and the control valve 18. On the other hand, the low clutch 2 is supplied with the line pressure through the passage 9, the ports 8 and 12 of the shift valve 3, the passage 13, the control valve 14 and the passage 15 including the throttling element 44. In this downshifting, in its initial stage, when the piston of the low clutch is being shifted to cancel its clearance, no substantial oil pressure is generated in the passage 15, and, therefore, the valve element 28 of the control valve 18 is shifted upward as shown in the figure, whereby the port 31 is disconnected from the port 32. In this condition, therefore, the oil pressure in the high clutch is drained only through the drain passage 56 including the throttling element 58, whereby the oil pressure in the high clutch is maintained at a relatively high level. This condition corresponds to range α in FIG. 4.

When the piston of the low clutch has cancelled its clearance, the oil pressure in the low clutch begins to increase substantially. This condition corresponds to point 'h' in FIG. 4. In response to this substantial increase in the oil pressure in the low clutch, the valve element 28 of the control valve is shifted downward, whereby the port 31 is connected to the port 32. Therefore, after this time point, the oil pressure in the high clutch is drained through both passages 56 and 57 containing the throttling elements 58 and 59, in parallel, whereby the oil pressure in the high clutch lowers abruptly from point 'i' which corresponds to the point 'h' in FIG. 4. By properly designing the throttling ratios of the throttling elements 58, 59 and 47 and the difference of land areas of the piston 37 of the accumulator 33, while the high clutch is being drained in this condition, the oil pressure in the high clutch is maintained at a medium level (range β in FIG. 4) which causes slippage of the high clutch. On the other hand, while the oil pressure in the high clutch is maintained at the medium level of the range β, the valve element 22 of the control valve 14 is shifted downward in the figure. Therefore, by properly designing the throttling ratios of the throttling elements 54 and 44 and the difference of land areas of the piston 38 of the accumulator 34, the oil pressure in the low clutch in this condition (ranges α in FIG. 4) is maintained at a relatively low level which causes slippage of the low clutch. When the piston 37 of the accumulator 33 has completed its upward shifting at the end of the range β, the oil pressure in the high clutch further lowers abruptly, and if the oil pressure lowers down to a predetermined level (point 'j' in FIG. 4), the valve element 22 of the control valve 14 is shifted upward in the figure, whereby the port 25 is connected to the port 26. Therefore, after this time point (point 'k' in FIG. 4) the low clutch is supplied with oil pressure through both passages 52 and 53 including the throttling elements 54 and 55 in parallel, whereby the oil pressure in the low clutch increases abruptly. At a middle portion of this abrupt increase of oil pressure (point 'd') the low clutch engages completely, and, thereafter, by way of region δ corresponding to the operation of the low speed accumulator the engagement of the low clutch is finally accomplished.

Figure 4:
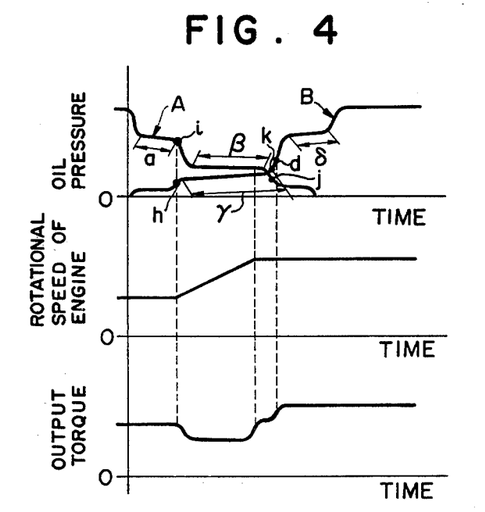
FIG. 4 shows diagrams illustrating the downshift performance of the oil pressure control means of the present invention.

Therefore, in accordance with the present invention, as is apparent from FIG. 4, the high and low clutches are maintained to be both in slipping condition in the mutually overlapping regions β and γ, whereby the engine gradually increases its rotational speed in a properly loaded condition. In the middle of this coslipping procedure of the high and low clutches, the rotational speed of the engine reaches the value which corresponds to the momentary vehicle speed at the gear ratio of the low speed stage, and, just subsequent to this, substantial emgagement of the low clutch is effected. Because of this smooth transfer from the high speed stage to the low speed stage, the output torque of the transmission undergoes a relatively small variation as shown in FIG. 4. Furthermore, since the low clutch is put into half-engagement before it is substantially engaged at point 'd', no abrupt variation of the output torque is caused. Furthermore, since the mutually overlapping ranges β and γ wherein the high and low clutches are half-engaged are definitely controlled by mutually detecting the oil pressure in the other clutch, no relative shifting of timing can possibly occur therebetween. Still furthermore, since the changing-over from high range driving to low range driving is effected in the middle of the mutually overlapping ranges β and γ, the timing for the changing-over of the two clutches is automatically and definitely maintained within the desired predetermined range.

Figure 5:
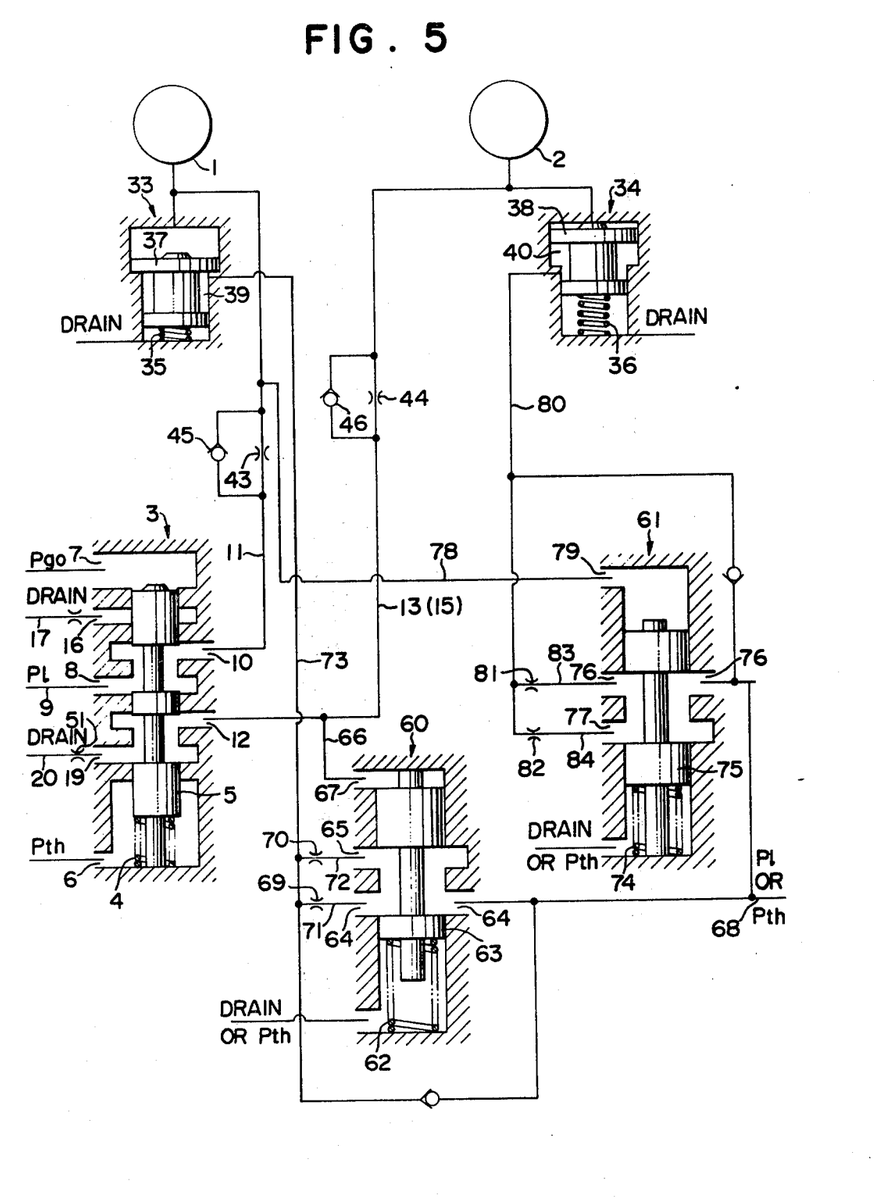
FIGS. 5, 6, and 7 are diagrams similar to that shown in FIG. 3 showing second, third and fourth embodiments of the oil pressure control means of the present invention.

FIG. 5 is a diagram similar to that shown in FIG. 3, showing another embodiment of the present invention. In FIG. 5 the portions corresponding to those shown in FIG. 3 are designated by the same reference numerals. In the embodiment shown in FIG. 5, the action of reducing abruptly the oil pressure in the high clutch from the level in the range α to the level in the range β at the point 'i' in response to the oil pressure in the low clutch at point 'h' is effected by controlling the back pressure of the high clutch accumulator 33 in response to the oil pressure in the low clutch by employing a control valve 60, while on the other hand the action of increasing abruptly the oil pressure in the low clutch from the level in the region γ to the level in the region δ at the point 'k' in response to the oil pressure in the high clutch at the point 'j' is effected by controlling the draining of the back pressure of the low clutch accumulator 34 in response to the oil pressure in the high clutch by employing a control valve 61. The control valve 60 comprises a valve element 63 which is urged upward in the figure by a compression coil spring 62 and is adapted to control the connection between ports 64 and 65. The valve element 63 is shifted downward if the oil pressure in the low clutch supplied to a port 67 through a passage 66 rises to the level of point 'h' in FIG. 4 so as to disconnect the port 64 from the port 65. Therefore, before the oil pressure in the low clutch rises to the level of point 'h', the back pressure chamber 39 of the high speed accumulator 33 is supplied with oil pressure (the line pressure or the throttle pressure) through a passage 68, the ports 64 and 65 in parallel, passages 71 and 72 individually including throttling elements 69 and 70 in parallel, and a passage 73, whereby the operating pressure of the accumulator 33 is maintained at a relatively high level as in the region α. However, when the oil pressure in the low clutch reaches the level of point 'h', the valve element 63 of the control valve 60 is shifted downward, whereby the port 64 is disconnected from the port 65, and, thereafter, the back pressure chamber 39 of the accumulator 33 is supplied with oil pressure only through the passage 71 including the throttling element 69, whereby the operating pressure of the accumulator 33 lowers abruptly to the level in the range β.

The control valve 61 comprises a valve element 75 which is urged upward in the figure by a compression coil spring 74 and is adapted to control the connection between ports 76 and 77. Pressure is exerted on the valve element 75 by the oil pressure in the high clutch through a passage 78 and a port 79. However, if the oil pressure in the high clutch lowers to the level at point 'j' in FIG. 4, the valve element 79 is shifted upward by the action of the spring 74 so as to disconnect the port 76 from the port 77. Therefore, before the oil pressure in the high clutch lowers down to the level at point 'j', the back pressure chamber 40 of the low speed accumulator 34 is exhausted through a passage 80, passages 83 and 84 individually including throttling elements 81 and 82 in parallel, and the passage 68, whereby the operating pressure of the accumulator 34 is maintained at a relatively low level as in the range γ. However, if the oil pressure in the high clutch lowers down to the level of point 'j', the valve element 75 of the control valve 61 is shifted upward so as to disconnect the port 76 from the port 77. Therefore, hereafter the back pressure chamber 40 of the accumulator is released only through the passage 83 including the throttling element 81, and consequently the operating pressure of the accumulator 34 increases abruptly to the level in the range δ from the point 'k' corresponding to point 'j'.

Thus, the change-over performance as shown in FIG. 4 can also be obtained by controlling the throttling ratio of the back pressure passages for the high and low speed accumulators in accordance with the oil pressures in the low and high clutches.

Figure 6:
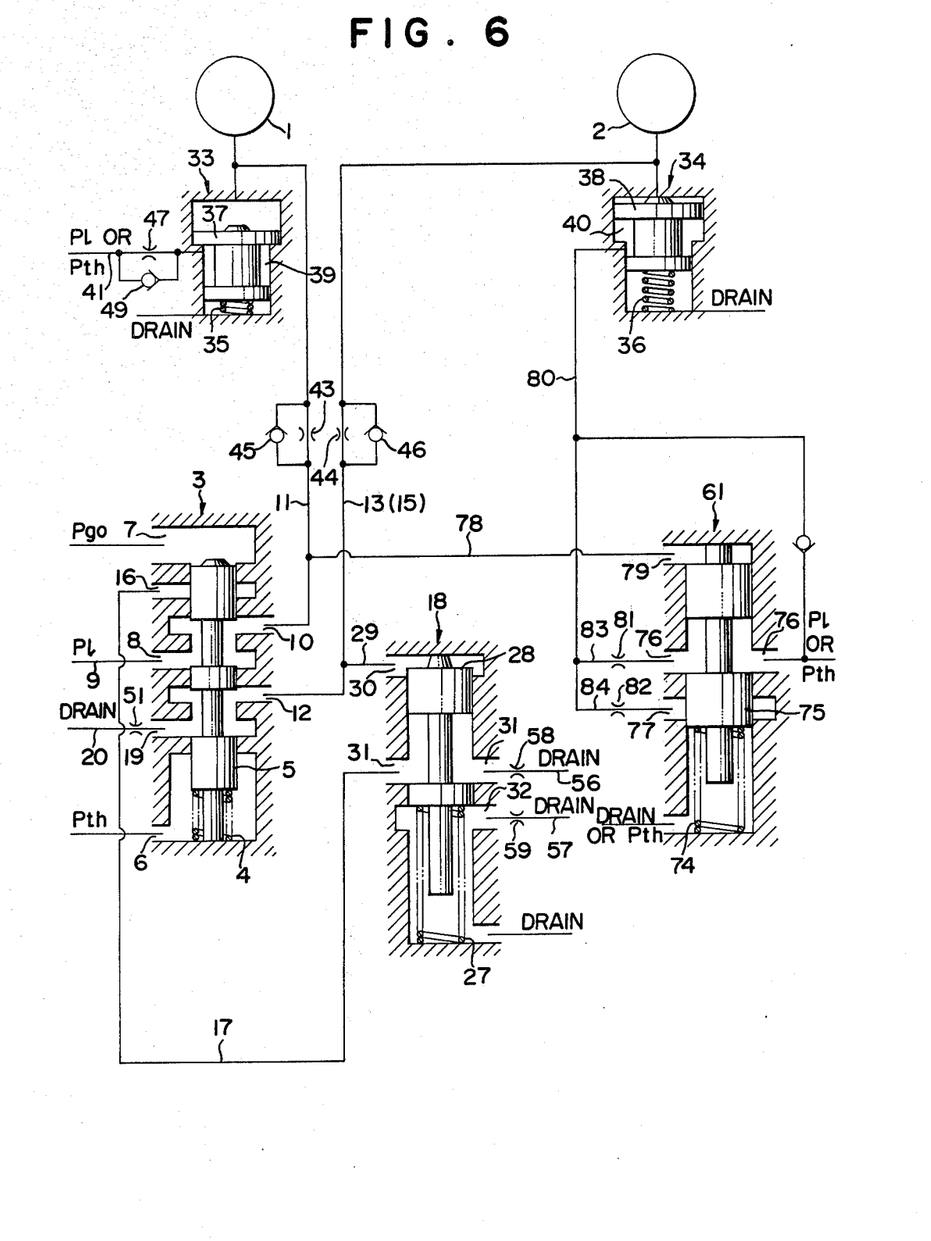

FIG. 6 is a diagram similar to those shown in FIGS. 3 and 5 showing still another embodiment of the present invention. This third embodiment has a structure which is intermediate between the first embodiment shown in FIG. 3 and the second embodiment shown in FIG. 5. In more detail, in this third embodiment the action of reducing abruptly the oil pressure in the high clutch from the level in the range α to that in the range β is made by controlling the drain passage of the high clutch by employing a control valve which is shifted in accordance with the oil pressure in the low clutch, as in the embodiment shown in FIG. 3, whereas the action of increasing abruptly the oil pressure in the low clutch from the level in the range γ to that in the range δ is made by controlling the back pressure passage of the low speed accumulator by employing a control valve which is shifted in accordance with the oil pressure in the high clutch, as in the embodiment shown in FIG. 5. It will be obvious that in this third embodiment the downshift performance as shown in FIG. 4 is also obtained. In FIG. 6 the portions corresponding to those in FIGS. 3 and 5 are designated by the same reference numerals, and detailed explanation of the structure and operation of the embodiment shown in FIG. 6 will be omitted to avoid needless repetition.

Figure 7:
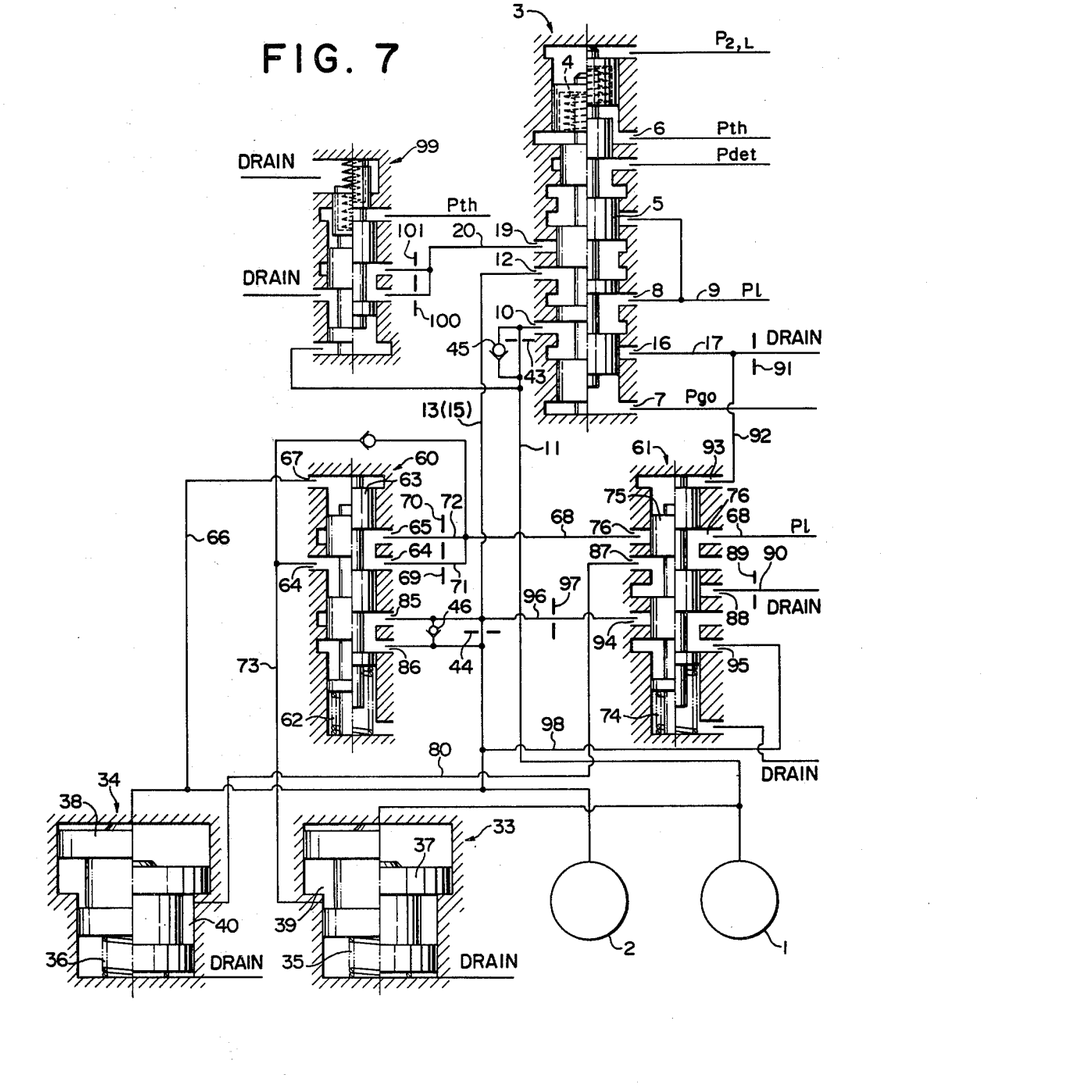

FIG. 7 is a diagram showing essential portions of a fourth embodiment of the oil pressure and control means of the present invention. In FIG. 7, also, the portions corresponding to those shown in FIGS. 3, 5 and 6 are designated by the same reference numerals. In this embodiment, before the oil pressure in the low clutch rises up to the level of point 'h', the valve element 63 of the control valve 60 is shifted upward. In this condition, the back pressure chamber 39 of the high speed accumulator 33 is supplied with oil pressure (the line pressure) through the passsage 68, the passages 71 and 72 individually including the throttling elements 69 and 70 in parallel, the ports 64 and 65 in parallel, and the passage 73, whereby the operating pressure of the accumulator 33 is maintained at a relatively high level as in the range α. When the oil pressure in the low clutch reaches the level of point 'h', the valve element 63 of the control valve 60 is shifted downward in the figure so as to disconnect the port 64 from the port 65. Therefore, hereafter (after point 'i'), the back pressure chamber 39 of the accumulator 33 is supplied with oil pressure only through the throttling element 69, whereby the operating pressure of the accumulator 33 lowers abruptly from the level in the range α to that in the range β. On the other hand, before the oil pressure in the low clutch reaches the level of point 'h', i.e., while the piston of the low clutch is moving to cancel its clearance, the low clutch is supplied with oil pressure through a bypass passage provided by ports 85 and 86 of the control valve 60 and bypassing the throttling element 44. However, when the oil pressure in the low clutch reaches the level of point 'h', the valve element 63 of the control valve 60 is shifted downward so as to disconnect the port 85 from the port 86. Therefore, hereafter, the low clutch is supplied with oil pressure to a relatively moderate degree through the throttling element 44, whereby the oil pressure in the low clutch is maintained at a relatively low level, as in the range γ. During this operation, the valve element 75 of the control valve 61 is shifted downward as explained hereinunder, and, therefore, the back pressure chamber 40 of the low speed accumulator 34 is drained through the passage 80, ports 87 and 88 of the control valve 61, and a drain passage 90 including a throttling element 89.

When the oil pressure of the high clutch is at the level in the range α or β, the oil pressure upstream of a throttling element 91 provided in the drain passage 17 is maintained above a predetermined level which is high enough to shift the valve element 75 of the control valve 61 downward in the figure when it is supplied to a port 93 through a passage 92. However, when the piston 37 of the high speed accumulator 33 has ended its shifting movement so that the oil pressure in the high clutch further lowers to the level of point 'j', the oil pressure in the drain passage 17 upstream of the throttling element 91 correspondingly lowers, whereby the valve element 75 of the control valve 61 is shifted upward in the figure. Therefore, a port 94 is now connected with a port 95, whereby a bypass passage which bypasses the throttling element 44 in the passage 13 is provided through a passage 96, throttling element 97, ports 94 and 95, and passage 98. Therefore, hereafter (after point 'k'), the low clutch is supplied with oil pressure through passages with throttling elements 44 and 97 in parallel. On the other hand, the back pressure chamber 40 of the low speed accumulator 34, which was connected to the drain passage 90 when the valve element 75 of the control valve 61 was shifted downward, is now connected to the passage 68 and is supplied with the line pressure. Thus, after point 'k', the oil pressure in the low clutch increases abruptly from the level in range γ to that in the range δ.

In FIG. 7, 99 designates an upshift timing valve which controls timing in upshifting. In more detail, in the initial stage of upshifting when the oil pressure in the high clutch is still low, it allows the low clutch to be drained only through a throttling element 100, and when the oil pressure in the high clutch reaches a predetermined level, it allows the low clutch to be drained through passages with throttling elements 100 and 101 in parallel. The upshift timing valve is well known in the art and does not constitute a part of the present invention. Therefore further explanation of this valve will be omitted. Furthermore, $P_{2,L}$ supplied to the shift valve 3 designates the oil pressure which is supplied when the transmission is shifted to 2 range or L range. $P_{det}$ designates the detent pressure which is supplied when the accelerator pedal is deeply stepped on, i.e., kick-down pressure.

Thus, it will be understood that the downshift performance as shown in FIG. 4 is also obtained by the embodiment shown in FIG. 7.

Although the invention has been shown and described with respect to some preferred embodiments thereof, it should be understood by those skilled in the art that various changes and omissions of the form and detail thereof may be made therein without departing from the scope of the invention.

We claim:

1. An oil pressure control means for an automatic transmission having a gear mechanism and low and high speed friction engaging means and adapted to provide alternatively two speed shift stages by changing over engagement of said two friction engaging means, comprising: a source of line pressure; a shift valve adapted to be shifted between a first shift position where it provides a passage for connecting said low speed friction engaging means to said source of line pressure while it provides a drain passage for said high speed friction engaging means and a second shift position where it provides a passage for connecting said high speed friction engaging means to said source of line pressure while it provides a drain passage for said low speed friction engaging means; low and high speed accumulators connected individually to the passages for supplying the line pressure to said low and high speed friction engaging means; a first control circuit means controlling by the oil pressure in said low speed friction engaging means so as to reduce the oil pressure in said high speed friction engaging means down to a level which causes slippage of said high speed friction engaging means while the oil pressure in said low speed friction engaging means rises but is still maintained at a level which permits slippage of said low speed friction engaging means; and a second control circuit means controlled by the oil pressure in said high speed friction engaging means so as to increase the oil pressure in said low speed friction engaging means up to a level which causes substantial engagement of said low speed friction engaging means when the oil pressure in said high speed friction engaging means lowers down to a level which causes substantial disengagement of said high speed friction engaging means.

2. The oil pressure control means of claim 1, wherein said first control circuit means comprises a control valve which is controlled by the oil pressure in said low speed friction engaging means and controls the drain passage for said high speed friction engaging means, said control valve being adapted to reduce the flow resistance of said drain passage when the oil pressure in said low speed friction engaging means rises up to a predetermined level.

3. The oil pressure control means of claim 1, wherein said high speed accumulator is of a back pressure control type having a back pressure chamber and a passage for supplying oil pressure to said back pressure chamber, and said first control circuit means comprises a control valve which is controlled by a oil pressure in said low speed friction engaging means and controls said back pressure passage of said high speed accumulator, said control valve being adapted to increase the flow resistance of said back pressure passage when the oil pressure in said low speed friction engaging means rises up to a predetermined level.

4. The oil pressure control means of claim 1, wherein said second control circuit means comprises a control valve which is controlled by the oil pressure in said high speed friction engaging means and controls the passage for supplying oil pressure to said low speed friction engaging means, said control valve being adapted to reduce the flow resistance of said oil pressure supply passage when the oil pressure in said high speed friction engaging means lowers down to a predetermined level.

5. The oil pressure control means of claim 1, wherein said low speed accumulator is of a back pressure control type having a back pressure chamber and a passage for supplying oil pressure to said pressure chamber, and said second control circuit means comprises a control valve which is controlled by the oil pressure in said high speed friction engaging means and controls the back pressure passage of said low speed accumulator, said control valve being adapted to reduce the flow resistance of said back pressure passage when the oil pressure in said high speed friction engaging means lowers down to a predetermined level.

6. The oil pressure control means of claim 1, wherein the drain passage for said high speed friction engaging means includes a throttling element, said low speed accumulator is of a back pressure control type having a back pressure chamber and a passage for supplying oil pressure to said back pressure chamber, and said second control circuit means comprises a control valve which is controlled by the oil pressure in said drain passage for said high speed friction engaging means upstream of said throttling element and controls the back pressure passage for said low speed accumulator, said control valve being adapted to drain said back pressure passage when the oil pressure in said drain passage upstream of said throttling element is above a predetermined level and to connect said back pressure passage to said source of line pressure while providing an additional bypass passage to the passage for supplying oil pressure to said low friction engaging means when the oil pressure in said drain passage upstream of said throttling element is below a predetermined level.

7. The oil pressure control means of claim 1, wherein the levels of the oil pressure in said high and low speed friction engaging means which cause slippage of the two friction engaging means are designed so that the transmission of driving torque is substantially transferred from said high speed friction engaging means to said low speed friction engaging means before the end of the co-slipping region of the two friction engaging means.

* * * * *